Nov. 26, 1968   J. E. G. TAYLOR ETAL   3,413,234
BENZO-β-NAPTHOISOSPIROPYRANS AND COMPOSITIONS COMPRISING SAME
Filed March 28, 1966

INVENTORS
JOHN E. G. TAYLOR,
DAVID B. MC QUAIN,
RICHARD E. FOX,
RICHARD E. BOWMAN &
FRANCIS D. THOMSON

BY *Louis A. Kline*
*Armand G. Morin Sr.*

THEIR ATTORNEYS 3,413,234
BENZO-β-NAPHTHOISOSPIROPYRANS AND
COMPOSITIONS COMPRISING SAME
John E. G. Taylor, David B. McQuain, Richard E. Fox, Richard E. Bowman, and Francis D. Thomson, Dayton, Ohio, assignors to The National Cash Register Company, Dayton, Ohio, a corporation of Maryland
Filed Mar. 28, 1966, Ser. No. 537,769
16 Claims. (Cl. 252—301.2)

This invention relates to novel spiropyran compounds and to polymeric compositions comprising them. More particularly, this invention relates to benzo - beta - naphthoisospiropyrans which, in solution, are principally either photochromic or fluorescent, depending on ambient conditions, and to polymeric films and coatings comprising said materials.

Many classes of photochromic materials are now known in the prior art, each class, and even each compound, having its own particular and distinctive set of properties. Such materials, as well as the novel compounds herein, undergo reversible color changes when activated by or exposed to selected photo-energy at selected ambient conditions. In general, such photochromic materials, when in liquid or solid solution, change from a relatively stable colorless state to a relatively unstable colored state when exposed to ultraviolet irradiation. When the irridiation is diminished or ceases entirely, the compounds tend, to a greater or lesser degree, to revert to their more stable colorless state. It has been found that the tendency of many photochromic materials to revert to an essentially colorless state, as mentioned above, is largely determined by ambient thermal effects or by the effect of exposure to long wavelength radiation, or both.

Many photochromic compounds of the prior art are reversibly photo-colorable and relatively stable in the colored form after activation with ultraviolet light, while in liquid or solid solution, only at very low temperatures, such as —60 degrees centigrade and below.

Other classes of photochromic materials are characterized as reversibly photochromic at more conventional temperatures, such as —20 to +30 degrees centigrade, and further are shown to possess high thermal stability within such temperature range. Such materials are disclosed, for example, in United States Patent No. 3,100,778, issued to Elliot Berman on Aug. 13, 1963. Other classes of photochromic materials, such as those disclosed in United States Patent No. 3,149,120, issued to Elliot Berman and David B. McQuain on Sept. 15, 1964, have relatively short thermal half-lives of approximately one to ten minutes. Hence, such materials are suitable for use in applications requiring a moderate fade rate; that is, applications in which the light-activated photochromics change from a high to a low optical density at a relatively moderate to fast rate. Examples of such applications include eye-protective filters, protective eye glasses, displays, and the like. From the foregoing, it is apparent that thermal stability is a critically important factor in determining the utility of compounds in which the photochromic effect is paramount. For the purposes of this invention, thermal stability is normally expressed as the half-life, $t_{1/2}$, of the colored form of a compound, wherein the half-life represents the rate at which the said colored form changes to the colorless form when in solution at a given temperature.

It is apparent from the above that many types of photochromic compounds are known in the art, the thermal half-lives of which range from a few seconds to many months.

The compounds of the present invention are novel compounds which, in common with some of the above-mentioned compounds, have very short thermal half-lives, the half-lives being less than one (1) second at 10 degrees centigrade and higher temperature. However, at sufficiently low temperatures, such as —50 degrees centigrade to —60 degrees centigrade, or when dissolved in selected solvents, more useful half-lives of a few seconds may be obtained with solutions of the novel compounds claimed herein. Additionally, the novel compounds, when dispersed in solvents therefor, such as dispersions thereof in liquid solvents or dispersions in solid polymeric solvents therefor (solid solutions), have been found to be strongly fluorescent when activated by ultraviolet radiation.

Thus, although of secondary importance, the novel materials of the invention may be utilized in applications which are based on the short thermal half-life of such compounds, many of which applications have previously been disclosed in connection with prior-art compounds having similar thermal characteristics. In addition to such typical utility, the compounds of the invention are useful in novel applications of photochromic compounds which are based on the characteristics of fluorescence, which characteristic is uniquely intense in materials and devices comprising the instant compounds.

The fluorescent character of the herein-described materials makes them useful in display devices, particularly in devices designed for transient data display, examples of which will be more specifically defined below. In regard to such display devices, it should be stated that the ultraviolet light sensitive element is generally in the form of a film, a cell, or a coating which comprises, as the active component thereof, materials comprising one or more of the novel compounds of the invention.

Light-sensitive elements of the invention generally include a polymeric material, preferably thermoplastic, either self-supporting or disposed on a support, and have dispersed or in solution therein one or more of the instantly-described and claimed compounds. Exposure of such materials to a source of ultraviolet light activates and/or stimulates the compounds dispersed therein so that activated areas will emit, in a pattern corresponding to the exposed areas, a strong fluorescent light having wavelengths in the visible portion of the electromagnetic spectrum.

Fluorescence is often described as luminescent emission during excitation. Although many luminescent materials emit electromagnetic radiation long after the source of radiation has been removed, for all practical purposes fluorescence of the instant materials ceases when the source of excitation is removed. Strictly speaking, there still remains a short emission period, or "afterglow," when excitation of such materials ceases; however, the "afterglow" fades exponentially and usually is of very short duration. The "afterglow" or post-excitation period of emission of many fluorescent materials is often less than $10^{-8}$ seconds. For purposes of this invention, materials in which the "afterglow" is $10^{-2}$ seconds or less in duration are considered to be fluorescent.

The invention will be more fully understood from reference to the accompanying drawings, wherein preferred forms of the invention are shown.

Figure 1:
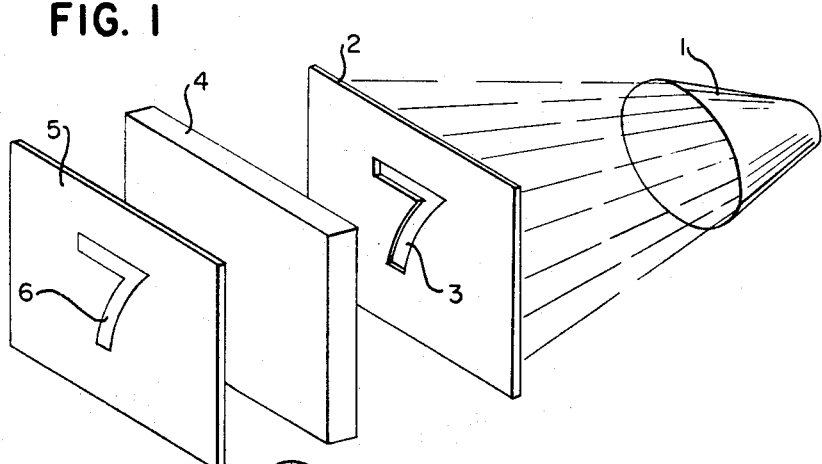
FIG. 1 is an exploded isometric view of a display system including a polymeric film on a transparent support, the said film comprising photochromic compounds of the invention.

Referring now to FIG. 1, there is shown an exploded view of a display device wherein a fluorescent film 5, made by one of several methods to be described below, is coated on transparent support 4. The support 4 may be any transparent medium which transmits ultraviolet light, such as glass, quartz, polymeric materials, and the like. The combination of the support 4 and the film 5 need not be arranged in the order shown in FIG. 1. It may be inverted, so that the film 5 is now adjacent the mask 2, which is interposed between the said film and ultraviolet light 1. When the ultraviolet rays from the light 1 strike the mask 2, only the light striking the aperture 3 is transmitted through the transparent support 4 to activate the film 5 and provide fluorescent area 6 to be viewed. The area 6, shown in FIG. 1 as numeral 7, will appear as a strong fluorescent light area so long as ultraviolet light activates the film 5. Deactivating the area 6 by any means, such as removing the light source 1 or substituting an opaque element for the mask 2, and the like, will render the area 6 non-fluorescent. The transformation from fluorescent to non-fluorescent takes place very rapidly, and the switch from one state to the other appears instantaneous. The transformation, however, generally occurs within a time frame of $10^{-2}$ seconds or less, depending on the constitution of the fluorescent film 5.

Figure 2:
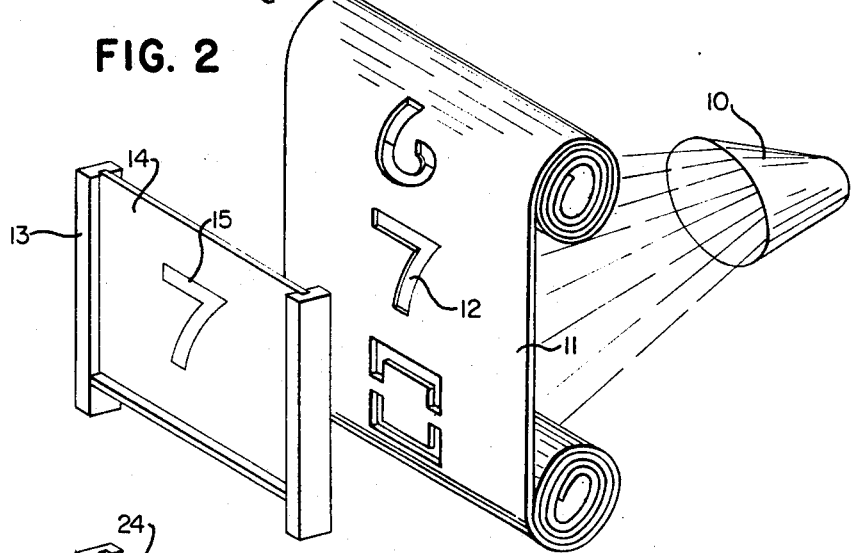
FIG. 2 is a view of an arrangement which includes a self-supporting polymeric film comprising fluorescent materials of the invention. There is also shown a mask in strip form for use with said film.

Referring to FIG. 2, there is shown a display comprising an ultraviolet light 10, a masking means 11, and a fluorescent film 14. The arrangement as well as the materials comprising the film 14 are similar to the corresponding parts shown in FIG. 1 except that the masking means 11 is provided in roll form or as an endless belt, and the film 14 is a self-supporting polymeric film or a luminescent polymeric film disposed on a transparent supporting polymeric film. More specifically, the modification shown in FIG. 2 comprises the ultraviolet light 10 directed towards the mask 11, which forms part of a roll or belt which includes a plurality of apertures, one of which is shown as the opening 12, to be selectively subjected to rays from the light 10. Ultraviolet light directed through the aperture 12 strikes the fluorescent film 14 and activates an area 15 in the pattern of the opening 12. The activated area, as described with respect to FIG. 1, is strongly fluorescent when so activated by ultraviolet light but immediately reverts to a non-fluorescent state when the source of excitation is removed.

It should be understood that it is also within the contemplation of the invention to provide, instead of the flat rectangular film 14, a photosensitive film in roll or strip form in the manner shown for the mask 11, which is depicted with rolled ends.

Figure 3:
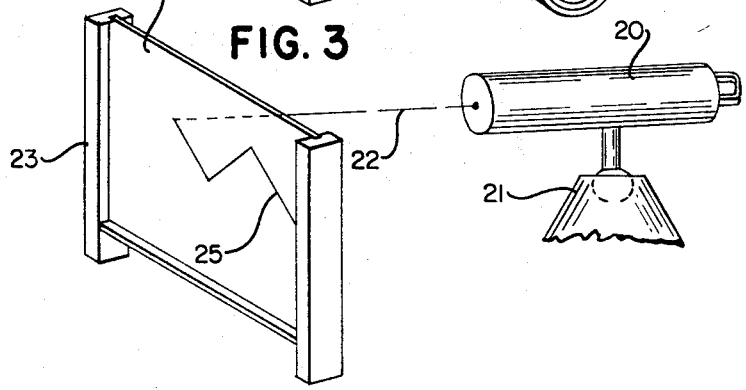
FIG. 3 shows another display arrangement, in perspective, including a source of ultraviolet light and a fluorescent screen of the invention.

In FIG. 3 there is shown a variant of the invention consisting of a combination of ultraviolet writing means 20 associated with a support and control means 21 and a flexible fluorescent film 24. The film 24 is generally supported as a vertical sheet in a support frame 23 and is so placed that the plane of the film 24 is essentially normal to the ultraviolet writing beam 22. In the figure, the light beam 22 is shown tracing the line 25. The light beam 22 is positioned in the X–Y directions in the plane of the film 24 by control means housed in the support 21. Details of the control means and of the ultraviolet light and associated circuits are not shown, since they form no part of the present invention. Furthermore, conventional light and control means are suitable for purposes of the invention.

The novel compounds of the invention are:

(1) 7'-nitro-2,3-diphenylbenzo-β-naphthoisopiroyran

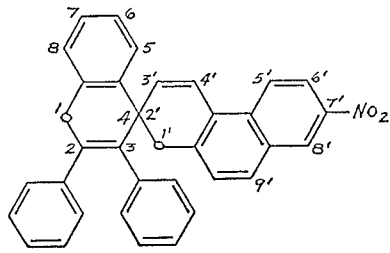

(2) 7'-nitro-7-methoxy-2,3-diphenylbenzo-β-naphthoisospiropyran

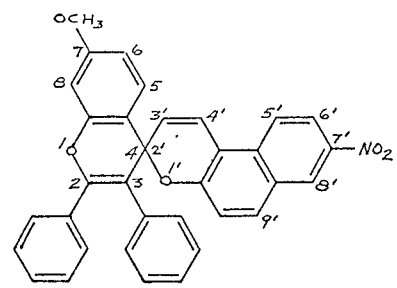

(3) 7'-nitro-7-methoxy-2-phenyl-3-methylbenzo-β-naphthoisospiropyran

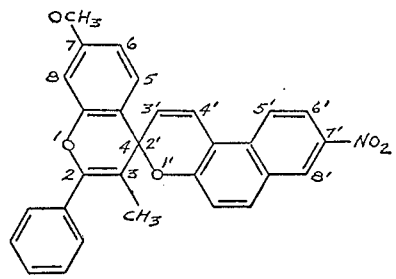

(4) 2-phenyl-3-(p-methoxyphenyl)-7'-nitrobenzo-β-naphthoisospiropyran

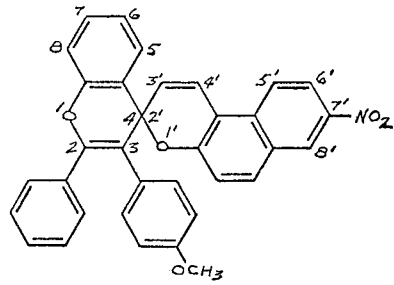

Example I

Compound 1 above is prepared in the following manner:

Sodium phenylacetate (80 g.; 0.5 mole), 80 g. (0.58 mole) of o-hydroxyacetophenone, and 130 g. (0.58 mole) of phenylacetic anhydride were heated together under reflux for six hours at 180 degrees centigrade. The product was poured into water and steam-distilled to remove all unchanged reactants. An ethereal extract of the residue, after being washed with aqueous alkali and dried, deposited 15 g. (0.0635 mole) of 3-phenyl-4-methyl-coumarin(I), which gave a melting point of 152 to 154 degrees centigrade.

A solution of phenylmagnesium bromide (40 ml. of 3 M ether solution) was slowly added over a period of one hour at room temperature to an ether solution of 15 g. (0.0635 mole) of 3-phenyl-4-methylcoumarin, and, after refluxing four hours, the reaction mixture was decomposed with 60 ml. of concentrated hydrochloric acid. The acid and solvent layers were then separated. 2,3-diphenyl-4-methylbenzopyrylium chloride (II) was obtained by neutralizing the acid layer with ammonium hydroxide in the presence of ether, followed by reprecipitation from the washed and dried ether solution with dry hydrogen chloride (15 g.; yield of 72%).

A solution of 4.5 g. (0.014 mole) of 2, 3-diphenyl-4-methylbenzopyrylium chloride and 3 g. (0.014 mole) of 6-nitro-2-hydoxy-1-naphthaldehyde in absolute ethanol was saturated with dry hydrogen chloride and left stand overnight at room temperature. The resultant naphthavinylpyrylium chloride (3.3 g.), which separated as a red precipitate, was hydrolyzed in acetone with ammonium hydroxide. The yellow isospiropyran was recrystallized from acetone-water to yield 2.5 g. (yield of 30%) of 7'-nitro-2, 3-diphenyl-benzo-β-naphthoisospiropyran (III), which had a melting point of 216 to 217 degrees centigrade.

Analysis calculated for $C_{33}H_{21}NO_4$: C, 80.0; H, 4.2. Found: C, 80.0; H, 4.2.

Example II

Compound 2 is prepared as follows:

A mixture of 60 g. (0.36 mole) of 2-hydroxy-4-methoxyacetophenone, 60 g. (0.34 mole) of potassium phenylacetate, and 88 g. (0.39 mole) of phenylacetic anhydride was heated at 200 degrees centigrade for five hours. The reaction mixture was poured into water and steam-distilled, and the residue was extracted with ether. The ether layer was washed with alkali, dried, and evaporated to yield 37 g. (yield of 39%) of 3-phenyl-4-methyl-7-methoxycoumarin (I) with a melting point of 106 to 107 degrees centigrade.

A solution of phenyl magnesium bromide (80 ml. of 3M ether solution) was slowly added to an ether solution containing 37 g. (0.13 mole) of 7-methoxy-4-methyl-3-phenylcoumarin, and, after refluxing four hours, the reaction mixture was decomposed with 80 ml. of concentrated hydrochloric acid. The acid and solvent layers were then separated. 7-methoxy-2,3-diphenyl-4-methylbenzopyrylium chloride (II) (32 g.; yield of 66%) was obtained by neutralizing the acid layer in the presence of ether, followed by reprecipitation with dry hydrogen chloride from the washed and dried ether solution.

A solution of 3.8 g. (0.01 mole) of 7-methoxy-2,3-diphenyl-4-methyl-benzopyrylium chloride and 2.2 g. (0.01 mole) of 6-nitro-2-hydroxy-1-naphthaldehyde in absolute ethanol was saturated with dry hydrogen chloride and left stand overnight at room temperature. The resultant naphthavinylpyrylium chloride (5.2 g.; yield of 87%) was hydrolyzed in acetone with ammonium hydroxide to yield the desired 7'-nitro-7-methoxy-2,3-diphenylbenzo-β-naphthoisospiropyran (III), which, after recrystallization from acetone-water, had a melting point of 220 to 221 degrees centigrade.

Analysis calculated for $C_{34}H_{23}NO_5$: C, 77.7; H, 4.4. Found: C, 77.7; H, 4.5.

Example III

Compound 3 is prepared as follows:

A mixture of 74 g. (0.445 mole) 2-hydroxy-4-methoxyacetophenone, 60 g. (0.46 mole) of propionic anhydride and 20 g. (0.21 mole) of sodium propionate was heated under reflux at 210 degrees centigrade for five hours. The reaction mixture was poured into water and steam-distilled, and the residue was extracted with ether. The ether layer was washed with alkali, dried, and evaporated to give a residual tarry solid which was crystallized from ethanol to yield 9.3 g. (yield of 10%) of 3,4-dimethyl-7-methoxycoumarin (I) as colorless needles with a melting point of 141 to 142 degrees centigrade.

A solution of phenylmagnesium bromide (0.09 mole) was slowly added to an ether solution of 9.3 g. (0.45 mole of 3,4-dimethyl-7-methoxycoumarin, and, after refluxing for three hours, the reaction mixture was decomposed with 30 ml. of concentrated hydrochloric acid. The acid and solvent layers were then separated. 7-methoxy-2-phenyl-3-methylbenzopyrylium chloride (II) (3.5 g.; yield of 33%) was obtained by neutralizing the acid layer in the presence of ether, followed by reprecipitation with dry hydrogen chloride from the washed and dried ether solution.

A solution of 1.5 g. (0.005 mole) of 7-methoxy-2-phenyl-3-methyl-benzopyrylium chloride and 1.1 g. (0.005 mole) of 6-nitro-2-hydroxyl-naphthaldehyde in absolute ethanol was saturated with dry hydrogen chloride and let stand overnight at room temperature. The resultant naphthavinylpyrylium chloride (2.1 g.; yield of 91%) was hydrolyzed in acetone with ammonium hydroxide to yield the desired 7'-nitro-7-methoxy-2-phenyl-3-methylbenzo-β-naphthoisospiropyran (III), which, after recrystallization from acetone-water, had a melting point of 202 to 203 degrees centigrade.

Analysis calculated for $C_{29}H_{21}NO_5$: C, 75.2; H, 4.5. Found: C, 75.6; H, 4.6.

Example IV

Compound 4 is prepared as follows:

A mixture of 50 g. (0.16 mole) of p-methoxyphenylacetic anhydride, 30 g. (0.16 mole) of sodium p-methoxyphenylacetate, and 22 g. (0.16 mole) of 2-hydroxyacetophenone was heated for two hours at 130 degrees centigrade and for three hours at 280 degrees centigrade. The reaction mixture was poured into water and steam-distilled, and the residue was extracted with ether. The ether layer was washed with alkali, dried, and then evaporated to yield 33 g. (yield of 80%) of 3-(p-methoxyphenyl)-4-methylcoumarin (I) with a melting point of 189 to 191 degrees centigrade.

A solution of phenyl magnesium bromide (80 ml. of a 3 M ether solution) was slowly added to an ether solution containing 33 g. (0.12 mole) of 3-(p-methoxyphenyl)-4-methylcoumarin, and, after refluxing for three hours, the reaction mixture was decomposed with 80 ml. of concentrated hydrochloric acid. The acid and solvent layers were then separated. 2-phenyl-3(p-methoxyphenyl)-4-methylbenzopyrylium chloride (II) (10 g.; yield of 20%) was obtained by neutralizing the acid layer in the presence of ether and by reprecipitation with dry hydrogen chloride from the washed and dried ether solution.

A solution of 3.8 g. (0.01 mole) of 2-phenyl-3-(p-methoxyphenyl)-4-methylbenzopyrylium chloride and 2.2 g. (0.01 mole) of 6-nitro-2-hydroxy-1-naphthaldehyde in glacial acetic acid was saturated with dry hydrogen chloride and let stand overnight at room temperature. The resultant naphthavinylpyrylium chloride (5.1 g.; yield of 85%) was hydrolyzed in acetone with ammonium hydroxide to yield the desired 7'-nitro-2-phenyl-3-(p-methoxyphenyl) - benzo - β - naphthoisospiropyran (III), which, after recrystallization from ethanol, had a melting point of 207 to 209 degrees centigrade.

Analysis calculated for $C_{34}H_{23}NO_5$: C, 77.7; H, 4.4. Found: C, 78.0; H, 4.3.

Example V.—Coated fluorescent film

A fluorescent element such as the combination typified by the film 5 disposed on the transparent support 4 of FIG. 1 is prepared by first preparing a polymer solution consisting of one part polymethyl methacrylate and four parts of toluene, both parts being by weight. Two percent. (2%) of compound (1), based on the weight of polymer solution, is dissolved in the solution, which action is aided by stirring the mixture and heating it to 80 degrees centigrade. The solution is then applied to a rigid glass substrate with a Baker film applicator to provide a dry film thickness of about 1 mil. The film is air-dried in a dust-free environment immediately after the coating operation.

Example VI.—Flexible fluorescent film

A flexible polymeric film comprising the compounds of the invention is made by coating a flexible polyethylene terephthalate sold under the trademark "Mylar" with a polymer solution made up as follows: 1% weight each of compounds 1 and 2 above, and 2% dibutyl phthalate are added to 1.5 parts of polystyrene dissolved in 3.5 parts of toluene, the parts by weight of compounds 1 and 2 and of dibutyl phthalate being based on the weight of polystyrene solution. The coating solution is applied to a strip of Mylar film with a Baker applicator and air-dried as in Example V above. Such flexible films are suitable as films 14 and 24 in FIGS. 2 and 3, respectively.

Example VII

A self-supporting fluorescent film is made by molding and stripping a polymer melt. Polystyrene resin such as polystyrene resin sold under the trademark "Piccolastic," a low-molecular-weight resin, is melted, and 2% by weight, based on the weight of the melt, of compound (1) described above is dispersed therein. It is made into a thin uniform film by pouring into a flat shallow mold form. The film is quenched and removed from the mold as a thin polystyrene film having compound 1 molecularly and homogeneously dispersed therein. The self-supporting film of this example is adapted for use in devices of the type shown in both FIGS. 2 and 3.

It will be apparent to those skilled in the art that other thermoplastic polymers, with or without plasticizers, as well as other solvents and combinations thereof, may be substituted for those in the above-described embodiments.

Among the many polymers which are useful for making the films of the invention, the preferred polymers are thermoplastic, such as polyvinyl chloride, polystyrene, polymethyl methacrylate, ethyl cellulose, cellulose acetate butyrate, polyvinyl acetate, styrene methyl methacrylate as sold under the trademark "Zerlon," and the like.

The amount of fluorescent or photochromic material incorporated into the polymer is not critical and generally depends on the solubility of the material and on the intensity of the fluorescent or photochromic effect desired. A concentration of the light-sensitive compounds ranging from 0.5% to 6%, preferably 1% to 2%, may be used.

Polymeric solutions for making coatings, such as the coatings of Examples V and VI above, may comprise from 10% to 40% by weight polymer and preferably from 20% to 30% of the polymer.

Solvents for thermoplastic resins are known, and such solvents, by way of example, as toluene, benzene, ethanol, ethyl acetate, acetone, mesitylene, Cellosolve acetate, carbon tetrachloride, trichloroethylene, and combinations thereof may be used.

Plasticizers, typical of which are dibutyl phthalate, dioctyl phthalate, and the like, when used, range from 0.5% to 10%, based on the polymer weight, and preferably from 1% to 5% by weight.

Any suitable source of ultraviolet light may be used for activating polymer films of the invention. Generally, a high-intensity ultraviolet lamp, such as a commercially available mercury vapor lamp, is suitable. As a source of ultraviolet light, a xenon flash tube, operating at 2500 volts and 400 watts, is particularly preferred.

The polymer films and/or coatings, as exemplified by the films 5 and 14 of FIG. 1 and FIG. 2, respectively, may be prepared in any conventional manner. Procedures such as flowing, casting, melt application, molding, and doctoring are well known and are available for preparing a desired film.

What is claimed is:
1. A composition comprising
  (a) a major portion of thermoplastic resin, having uniformly dispersed therein, in minor proportion,
  (b) a compound selected from the group consisting of
    (1) 7'-nitro - 2,3 - diphenylbenzo-β-naphthoisospiropyran;
    (2) 7'-nitro-7-methoxy-2,3-diphenylbenzo-β-naphthoisospiropyran;
    (3) 7'-nitro-7-methoxy-2-phenyl-3-methylbenzo-β-naphthoisospiropyran; and
    (4) 2 - phenyl-3-(p - methoxyphenyl)-7'-nitrobenzo-β-naphthoisospiropyran.

2. A composition according ot claim 1 wherein the compound is 7'-nitro-2,3-diphenylbenzo-β-naphthoisospiropyran.

3. A composition according to claim 1 wherein the compound is 7'-nitro-7-methoxy-2,3 - diphenylbenzo-β-naphthoisospiropyran.

4. A composition according to claim 1 wherein the compound is 7'-nitro-7-methoxy-2-phenyl-3-methylbenzo-β-naphthoisospiropyran.

5. A composition according to claim 1 wherein the compound is 2-phenyl-3-(p-methoxyphenyl)-7'-nitrobenzo-β-naphthoisospiropyran.

6. A thin fluorescent polymeric film comprising
  (a) a major portion of thermoplastic resin, having uniformly dispersed therein, in minor proportion,
  (b) a compound selected from the group consisting of
    (1) 7'-nitro-2,3-diphenylbenzo-β-naphthoisospiropyran;
    (2) 7'-nitro-7-methoxy-2,3-diphenylbenzo-β-naphthoisospiropyran;
    (3) 7'-nitro-7-methoxy-2-phenyl-3 - methylbenzo-β-naphthoisospiropyran; and
    (4) 2-phenyl - 3 - (p-methoxyphenyl)-7'-nitrobenzo-β-naphthoisospiropyran.

7. A light-sensitive element comprising, in combination,
  (a) a sheet support member transparent to ultraviolet light, and, coated thereon,
  (b) a thin thermoplastic polymer layer comprising, homogeneously dispersed therein, a compound selected from the group consisting of
    (1) 7'-nitro-2,3-diphenylbenzo-β-naphthoisospiropyran;
    (2) 7' - nitro - 7 - methoxy-2,3-diphenylbenzo-β-naphthoisospiropyran;
    (3) 7'-nitro-7-methoxy-2-phenyl-3 - methylbenzo-β-naphthoisospiropyran; and
    (4) 2 - phenyl-3-(p-methoxyphenyl)-7'-nitrobenzo-β-naphthoisospiropyran.

8. The light-sensitive element of claim 7 wherein the compound is 7'-nitro-2,3-diphenylbenzo-β-naphthoisospiropyran.

9. The light-sensitive element of claim 7 wherein the compound is 7'-nitro-7-methoxy - 2,3-diphenylbenzo-β-naphthoisospiropyran.

10. The light-sensitive element of claim 7 wherein the compound is 7'-nitro-7-methoxy-2-phenyl-3-methylbenzo-β-naphthoisospiropyran.

11. The light-sensitive element of claim 7 wherein the compound is 2-phenyl-3-(p-methoxyphenyl)-7'-nitrobenzo-β-naphthoisospiropyran.

12. A spiropyran compound selected from the group consisting of
  (1) 7'-nitro-2,3-diphenylbenzo-β-naphthoisospiropyran;
  (2) 7'-nitro-7-methoxy-2,3-diphenylbenzo-β - naphthoisospiropyran;

(3) 7'-nitro - 7 - methoxy-2-phenyl-3-methylbenzo-β-naphthoisospiropyran; and
(4) 2-phenyl - 3 - (p-methoxyphenyl)-7'-nitrobenzo-β-naphthoisospiropyran.

13. 7'-nitro-2,3-diphenylbenzo-β-naphthoisospiropyran.
14. 7'-nitro-7-methoxy-2,3-diphenylbenzo - β - naphthoisospiropyran.
15. 7'-nitro-7-methoxy-2-phenyl-3-methylbenzo-β-naphthoisospiropyran.
16. 2-phenyl - 3 - (p-methoxyphenyl)-7'-nitrobenzo-β-naphthoisospiropyran.

References Cited

UNITED STATES PATENTS 2,978,462  4/1961  Berman et al. _____ 260—345.2

OTHER REFERENCES

Heilbron et al., "J. Chem. Soc.," pp. 1571–2 (1934).

HELEN M. McCARTHY, *Primary Examiner.*

J. COOPER, *Assistant Examiner.*